(12) United States Patent
Dawson

(10) Patent No.: US 7,356,691 B2
(45) Date of Patent: *Apr. 8, 2008

(54) AUTHENTICATION OF MOBILE WIRELESS NETWORK COMPONENT

(75) Inventor: Thomas Patrick Dawson, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 310 days.

This patent is subject to a terminal disclaimer.

(21) Appl. No.: 11/050,556

(22) Filed: Feb. 3, 2005

(65) Prior Publication Data

US 2005/0132234 A1 Jun. 16, 2005

Related U.S. Application Data

(63) Continuation-in-part of application No. 10/225,332, filed on Aug. 20, 2002, now Pat. No. 7,260,714.

(51) Int. Cl.
*H04L 9/00* (2006.01)

(52) U.S. Cl. .................. 713/155; 725/141; 710/303; D14/434

(58) Field of Classification Search .......... 725/91, 725/103, 141; 705/26, 22; 713/1, 2, 155, 713/112; 710/303; D14/434
See application file for complete search history.

(56) References Cited

U.S. PATENT DOCUMENTS

| 5,544,321 | A | 8/1996 | Theimer et al. |
| 5,544,322 | A | 8/1996 | Cheng et al. |
| 5,555,376 | A | 9/1996 | Theimer et al. |
| 5,574,860 | A | 11/1996 | Perlman et al. |
| 5,807,124 | A | 9/1998 | Bricaud et al. |
| 5,836,776 | A | 11/1998 | Koch |
| 5,892,824 | A | * 4/1999 | Beatson et al. ............. 713/186 |
| 5,987,153 | A | 11/1999 | Chan et al. |
| 6,044,062 | A | 3/2000 | Brownrigg et al. |
| 6,151,628 | A | 11/2000 | Xu et al. |
| 6,157,935 | A | * 12/2000 | Tran et al. .................. 715/503 |
| 6,202,158 | B1 | 3/2001 | Urano et al. |
| 6,269,395 | B1 | 7/2001 | Blatherwick et al. |
| 6,272,129 | B1 | 8/2001 | Dynarski et al. |
| 6,275,934 | B1 | 8/2001 | Novicov et al. |
| 6,353,599 | B1 | 3/2002 | Bi et al. |
| 6,374,079 | B1 | 4/2002 | Hsu |
| 6,405,049 | B2 | * 6/2002 | Herrod et al. .............. 455/517 |

(Continued)

*Primary Examiner*—Emmanuel L. Moise
*Assistant Examiner*—Paul Callahan
(74) *Attorney, Agent, or Firm*—Miller Patent Services; Jerry A. Miller

(57) ABSTRACT

A wireless home entertainment system consistent with certain embodiments has at least one server, wherein the server includes a cradle having a first authentication switch forming a part thereof, wherein the first authentication switch is not a general purpose data entry element. At least one component is in wireless communication with the server, the component having a cradle mating portion that mates in the cradle. A second authentication switch resides at the cradle mating portion, wherein a person can cause the server to regard the component as being authenticated by mating the cradle mating portion with the cradle in a manner that causes actuation of said first and second switches. This abstract is not to be considered limiting, since other embodiments may deviate from the features described in this abstract.

32 Claims, 4 Drawing Sheets

U.S. PATENT DOCUMENTS

| | | |
|---|---|---|
| 6,480,101 B1 | 11/2002 | Kelly et al. |
| 6,595,929 B2 * | 7/2003 | Stivoric et al. ............. 600/549 |
| 6,608,911 B2 | 8/2003 | Lofgren et al. |
| 6,641,050 B2 * | 11/2003 | Kelley et al. ............... 235/492 |
| 6,650,901 B1 * | 11/2003 | Schuster et al. ......... 455/456.1 |
| 7,024,478 B1 * | 4/2006 | Dalgic et al. ............... 709/225 |
| 2002/0035699 A1 | 3/2002 | Crosbie |
| 2002/0059530 A1 | 5/2002 | Talvitie |
| 2002/0083341 A1 | 6/2002 | Feuerstein et al. |
| 2002/0087887 A1 | 7/2002 | Busam et al. |
| 2004/0002245 A1 | 1/2004 | McDaid et al. |
| 2004/0054897 A1 * | 3/2004 | Dawson et al. ............. 713/168 |
| 2004/0070564 A1 * | 4/2004 | Dawson et al. ............. 345/156 |

* cited by examiner

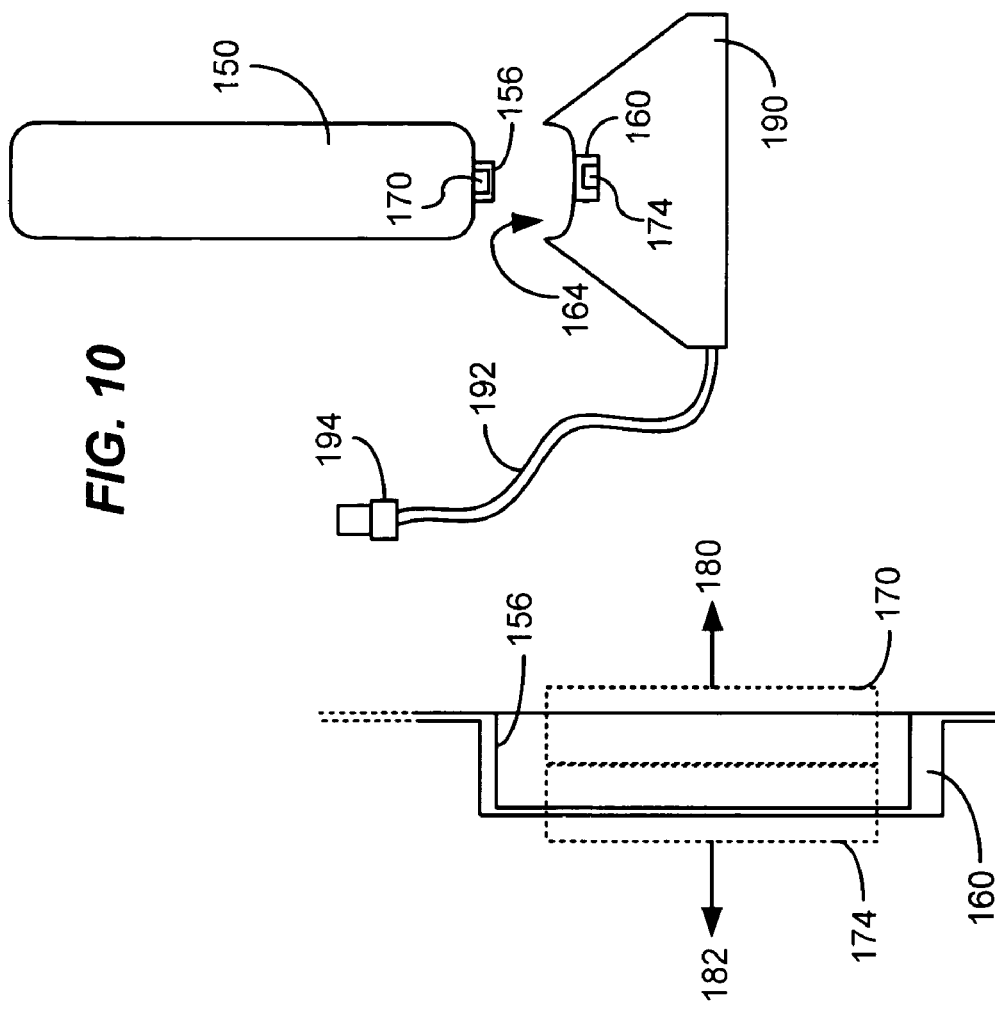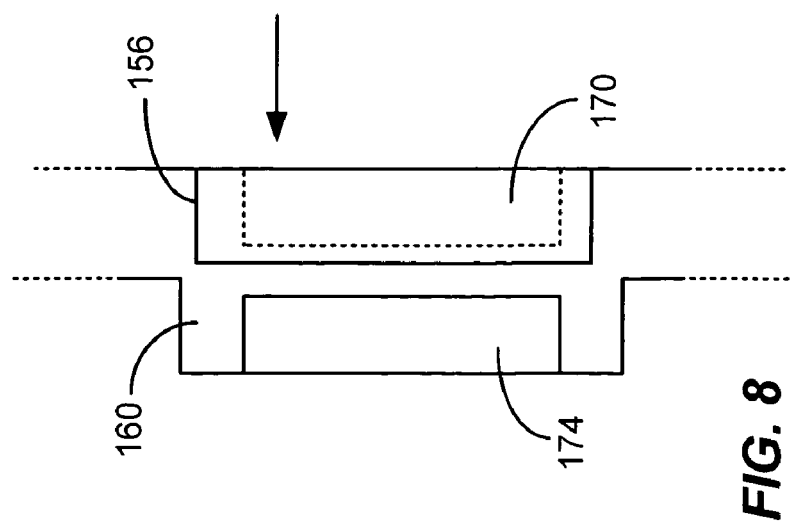

AUTHENTICATION OF MOBILE WIRELESS NETWORK COMPONENT

CROSS REFERENCE TO RELATED DOCUMENTS

This application is a continuation-in-part of published U.S. Patent Application publication number 2004/0054897, Ser. No. 10/225,332 to Dawson et al., filed Aug. 20, 2002 and published Mar. 18, 2004, now U.S. Pat. No. 7,260,714, issued Aug. 21, 2007, which is hereby incorporated herein by reference.

BACKGROUND

In-home wireless entertainment systems can include a central server and various components that are in wireless communication with the server and that are dispersed throughout the house. For examples, TVs, digital video disk (DVD) recorders, VCRs, Digital Video Recorders, telephones, personal digital assistants (PDAs), appliances, and so on may all be linked in a wireless entertainment system.

In a wired system, authentication is not generally a problem, since a component must be physically present in the home to communicate with the system. In a wireless system, however, it is possible for an eavesdropper or otherwise unauthorized person outside the home to access the system using the wireless network, which typically extends beyond the walls of the house.

Currently, wireless components are authenticated during "set up" using procedures that, for many consumers, can be confusing and complicated, and furthermore that might be less than secure.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 8 is an illustration of the connectors in a near mating arrangement consistent with certain embodiments of the present invention.

FIG. 9 is an illustration of the connectors in a mating arrangement consistent with certain embodiments of the present invention.

FIG. 10 is an illustration of an alternate embodiment of an authentication cradle consistent with certain embodiments of the present invention.

DETAILED DESCRIPTION

Figure 1:
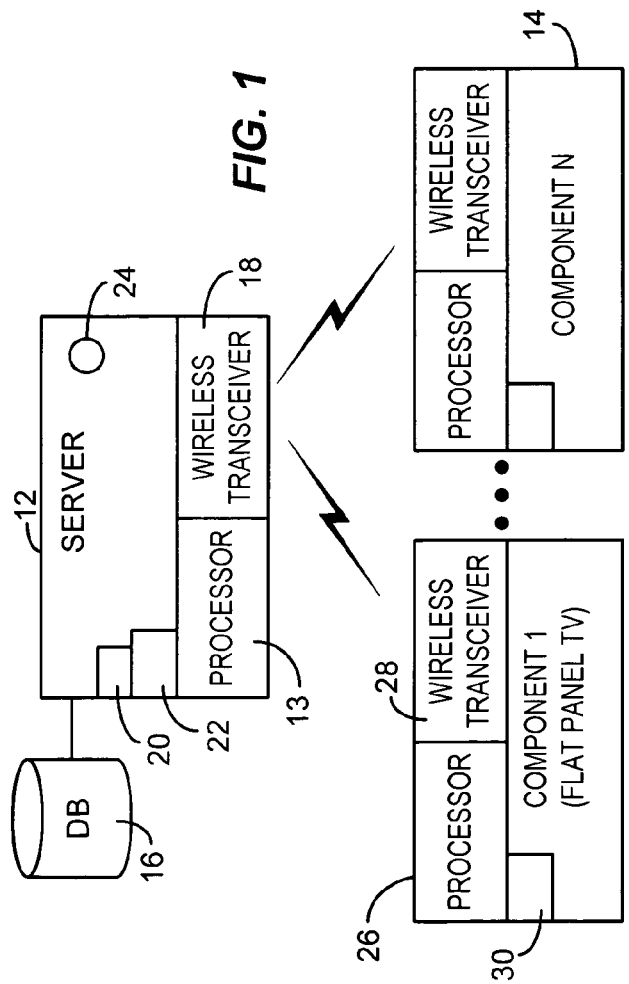
FIG. 1 is a is a block diagram of the system architecture consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Referring initially to FIG. 1, an example wireless home entertainment system is shown, generally designated 10, which includes a server 12 that can be implemented by any appropriate processor 13 and one or more components 14 that are in wireless communication with the server 12. For ease of illustration FIG. 1 shows two components 14, although more components 14 can be used. Non-limiting examples of embodiments of the components 14 are televisions, including portable flat-panel TVs, digital video disk (DVD) players, video cassette recorders (VCR), telephones, personal digital assistants (PDAs), digital video recorders (DVR) and household appliances.

Certain embodiments consistent with the present invention provide a simple mechanism for a user to authorize a hand held wireless client to be part of a wireless network. To maintain content protection and overall system security, any client using a wireless network must be authorized to do so. Authentication or authorization is a one time process. After authorization, clients are authenticated into the network whenever they wish to connect to it. While the authentication process is automatic, the authorization process is still manual. Current methods for authorizing a client into a wireless network involve having the user enter a series of cryptic values through some sort of manual user interface. Entering these values on small hand held devices such as PDAs and telephones can be a daunting task. Having to explain the process and guide the user through the steps needed to enter the data manually presents a problem for wide acceptance of wireless systems. Embodiments consistent with the present invention provide a mechanism for one time authorization needed to accept a client device as part of the wireless network.

In the particular embodiment shown in FIG. 1, the server 12 can access a database 16 of, e.g., audio-video content. In addition to the processor 13, the server 12 can also include a wireless transceiver 18, e.g., a code division multiple access (CDMA) transceiver. Other wireless communication principles, however, can be used, including other radiofrequency, infrared, and acoustic transmission principles.

In accordance with certain embodiments, the server 12 incorporates at least one and more preferably two human-manipulable authentication elements 20, 22. The elements 20, 22 may be implemented as buttons or toggles or switches or their functional equivalents. In any case, by "authentication element" is meant a manipulative device such as a button that does not function as a data entry device such as a keypad or keyboard, but instead is a single-purpose element that cannot be used for general data entry, but that simply activates the server to function in accordance with the logic below. In the example non-limiting embodiment shown in FIG. 1, a first authentication element 20, when manipulated, indicates that the component 14 sought to be registered for authentication is to have unlimited system access. In contrast, a second authentication element 22, when manipulated, indicates that the component 14 sought to be registered for authentication is to have limited system access, e.g., access to only predetermined content or channels.

As also shown in FIG. 1, the server 12 may include an indication 24 (visible and/or audible) that can be implemented by a light emitting diode (LED), a front panel display message, a message on a display screen associated with the server 12, etc. As discussed further below, the indication 24 is used to indicate successful registration for authentication of a component 14.

Turning to the specifics of an example non-limiting component 14, each component 14 may include a processor 26 and a wireless transceiver 28 for communicating with the server 12 and/or other components 14. The component processor 26 and server processor 13 may act alone or in concert with each other to execute the logic herein. Also, each component 14 includes at least one human-manipulable authentication element 30.

Figure 2:
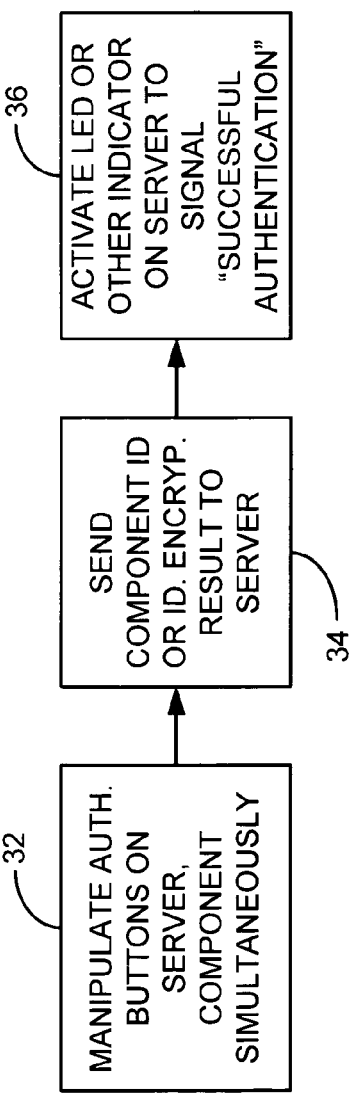
FIG. 2 is a flow chart showing the authentication logic consistent with certain embodiments of the present invention.

FIG. 2 shows the authentication logic of certain embodiments consistent with the present invention, as can be embodied in software or hardware. FIG. 2, as well as all other flow charts shown herein, is in logic flow format for convenience of disclosure, but part or all of the logic can be implemented by programmed processor, state machines or other logic devices.

Commencing at block 32, a user wishing to register a component 14 for authentication (also generally referred to herein as "authenticating" or "authorizing" the component) simultaneously manipulates the component authentication element 30 and one of the server authentication elements 20, 22 (depending on the level of system access to be granted the component 14). Manipulation of the server authentication element 20 causes the server to be configured to receive a message from the component 14. This message is transmitted at block 34 by the component 14 in response to manipulation of the component authentication element 30. When the server authentication element 20, 22 and component authentication element 30 are buttons, manipulation at block 32 can include depressing and holding down the buttons until the indication 30 is activated as described below.

In one non-limiting embodiment, the message from the component 14 includes a unique identification associated with the component 14. This ID can be programmed into the component 14 at time of manufacture of either the processor 26 chip or component 14 manufacture or assembly, and can be input to a write-once read many type of device, such as a fusible link ROM. Alternatively, for even greater security the message transmitted by the component 14 can be an encryption result of the ID. For instance, the ID can be used as a seed for a key generation algorithm. In this case, the key, which may not be readable from any outside component, might not be transmitted, but rather only the results of an encryption algorithm that uses the key. This can be part of an overall authentication key exchange that might be implemented in accordance with public key/private key principles known in the art.

Proceeding to block 36, if the message is successfully read and processed by the server 12, the indication 24 can be activated to so inform the user. At this point, the component 14 has been authenticated to the server 12 to afford the component 14 the level of system 10 access indicated by the server authentication element 20, 22 that was manipulated. Subsequently, the component 14 can automatically communicate with the server 12 in accordance with session wireless authentication procedures known in the art.

Figure 3:
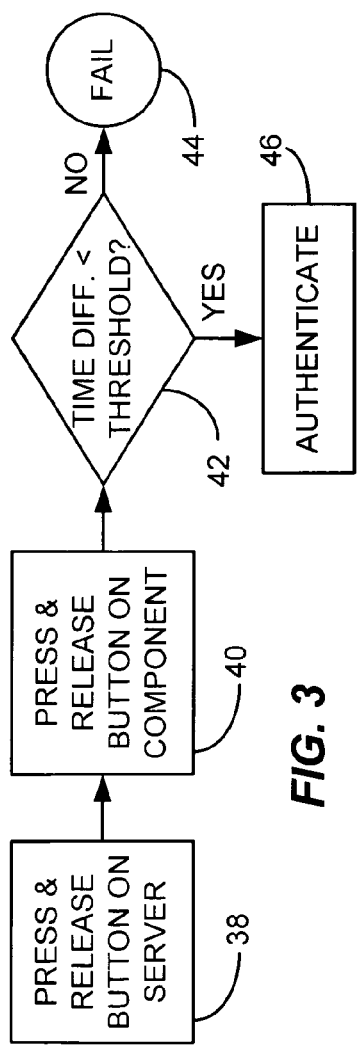
FIG. 3 is a flow chart showing alternate authentication consistent with certain embodiments of the present invention.

FIG. 3 shows that in an alternate embodiment, the server authentication element and component authentication element need not be manipulated simultaneously with each other, but rather can be manipulated within a predetermined time period of each other, e.g., a second or two. It can be seen that the first embodiment is a subset of the second, since simultaneousness is within a predetermined time period. Accordingly, at block 38 the server authentication element 20, 22 is manipulated and released. Then, at block 40 the component authentication element 30 is manipulated and released. At decision diamond 42 it is determined whether the manipulations occurred within the predetermined period and if not, "fail" is returned at state 44. Otherwise, "authenticate" is indicated at block 46. At this point, the component is authenticated and added to a list of authorized components to communicate with the network. In this embodiment, clocks in the component 14/server 12 can be synchronized.

Figure 4:
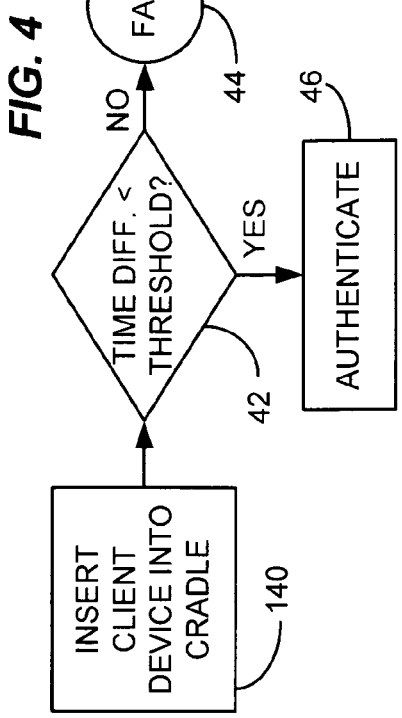
FIG. 4 is a flow chart depicting authentication using an authentication cradle consistent with certain embodiments of the present invention.
Figure 7:
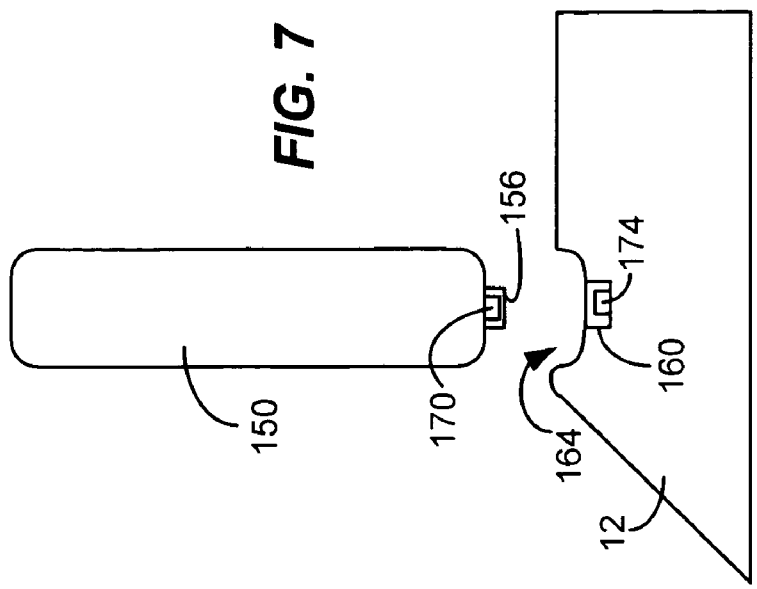
FIG. 7 is a side view of the server device having an authentication cradle consistent with certain embodiments of the present invention.

Referring now to FIG. 4, an authorization mechanism that is, in many cases, particularly useful for mobile wireless devices such as telephones and PDAs is described in block diagram form. In this process, much like the process of FIG. 3, the authentication process takes place when a button on the client device and the server are both actuated within a prescribed period of time (less than a threshold time value). However, in this case, the actuation of the buttons occurs in block 140 when the client device is inserted into or otherwise mated with a cradle forming a part of the server, or (equivalently) connected to the server. Exemplary cradle and client devices are illustrated in FIGS. 7, 8 and 10.

Figure 5:
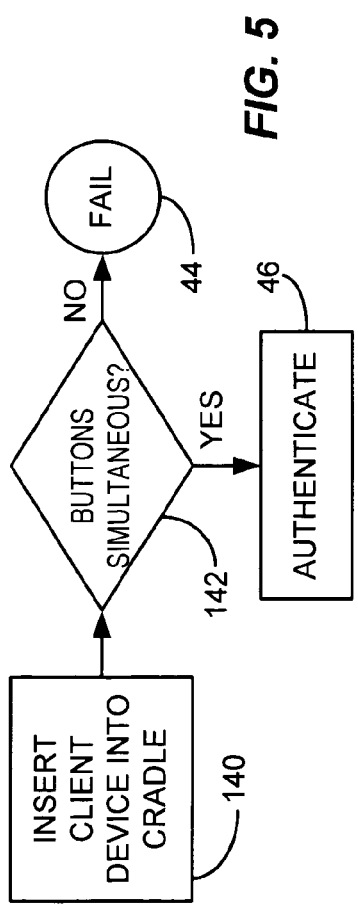
FIG. 5 is a flow chart depicting another embodiment of authentication using an authentication cradle consistent with certain embodiments of the present invention.

In a similar embodiment, depicted in FIG. 5, the authentication can take place when there is simultaneous or near simultaneous actuation of the buttons at 142. It is noted, that this can, under certain circumstances, be considered a subset of the operation depicted in FIG. 4, with the term simultaneous meaning approximately the same time and corresponding to a small threshold value in 42. In other embodiments, actuation of the switch associated with the buttons can be required to be simultaneous (e.g., some overlap in timing while the switches are in their active state).

Thus, a method consistent with certain embodiments for authenticating a component in wireless communication with a server to the server involves mating the component to a cradle residing on the server in order to actuate a switch on the server; the mating further causing actuation of a switch on the component to cause the component to transmit a message; and returning "authenticated" at the server in response to receiving the message only if the switches are actuated within a predetermined time period of each other.

Figure 6:
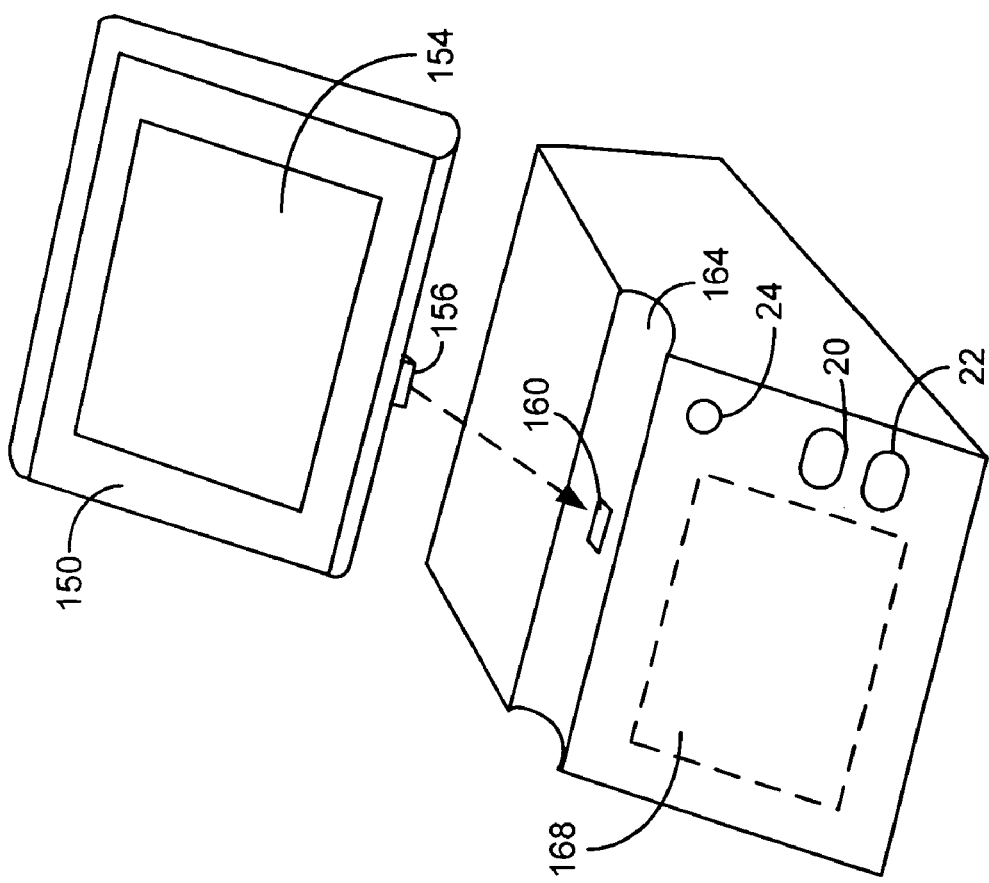
FIG. 6 illustrates a server device having an authentication cradle consistent with certain embodiments of the present invention.

FIG. 6 depicts a server and client device consistent with the embodiment described in conjunction with the flow charts of FIG. 4 and FIG. 5. The client device 150 can, for example, represent a PDA or another such mobile wireless device that may incorporate a screen display 154 as a user interface. In this embodiment, on a lower surface of client device 150 is a male connector 156 that protrudes from the lower Surface thereof. This connector is designed to make a mated engagement with a corresponding female connector 160 within an authentication cradle 164 region of the server device 12. In other embodiments, the roles of the male and female connectors can be reversed such that the female connector is on the client device 150 and the male connector is on the server device 12, without limitation.

Server device (or access point) 12 also may incorporate an LED or other indicator 24 and may include buttons 20 and 22 as well as other user interface components represented by 168.

When the male and female connectors 156 and 160 are engaged with one another, a pair of buttons—one on each of the server 12 and client 150 are depressed initiating the processes described above in connection with FIG. 4 and FIG. 5. FIG. 7 shows the client device 150 and the server device 12 in side cutaway view illustrating the cradle 164 in position to receive the client device 150 and connector 156 is shown exposing a button 170 within the connector. Similarly, the connector 160 is shown with button 174 exposed.

A cutaway view of the connectors 160 and 156 is shown in FIG. 8 preparing to engage, and in FIG. 9 engaged. In this sequence of illustrations, as the male connector 156 engages the female connector 160, buttons 170 and 174 come into contact and begin to move in the directions depicted by arrows 180 and 182 respectively. This movement is used to control the making or breaking of an electrical contact and initiate the actions described in connection with FIG. 4 or FIG. 5 as described above.

Of course, the simple button arrangement described can be used or other equivalent embodiments can be readily envisioned upon consideration of the present teachings. For example, the buttons or switches can be built into a USB or other standard or custom designed connector. Additionally, rather than positioning the buttons at the center of the connector as depicted, the mechanism that ultimately causes making or breaking of the electrical connection can be placed at an edge rather than centered as shown. Moreover, in other embodiments, the connectors can be designed such that a metal portion of the female connector is used to complete a circuit connection on the male connector and vice versa to accomplish an equivalent function. Other equivalent functional mating connector devices will occur to those skilled in the art upon consideration of the present teaching.

Thus, a multimedia server consistent with certain embodiments has a cradle for receiving a wireless component and connecting thereto. A switch resides on the cradle that is actuated upon connecting the wireless component to the cradle, wherein the manipulable authentication element is not a general purpose data entry element. A wireless transceiver provides wireless communication with network components. A programmed processor oversees communication with components on a list of authenticated components, wherein a person can cause the server to regard an component as being authenticated by mating the component with the cradle.

Thus, a wireless home entertainment system consistent with certain embodiments has at least one server, wherein the server includes a cradle having a first authentication switch forming a part thereof, wherein the first authentication switch is not a general purpose data entry element. At least one component is in wireless communication with the server, the component having a cradle mating portion that mates in the cradle. A second authentication switch resides at the cradle mating portion, wherein a person can cause the server to regard the component as being authenticated by mating the cradle mating portion with the cradle in a manner that causes actuation of said first and second switches.

FIG. 10 depicts another embodiment consistent with the present invention, wherein an authentication cradle device 190 is designed to be a separate component from the server itself. The functions of elements 156, 160, 164, 170 and 174 are as previously described. In this embodiment, the cradle 190 is connected to the server via a wire 192 through a connector (e.g., a USB connector (Universal Serial Bus)). This facilitates use of several authentication connector configurations or permits the current authentication mechanism to be provided as an option, yet preserves the need to have physical access to an authentication cradle in order to authenticate a client device. Other connectors can be used without departing from the present invention. In one embodiment, the connector 194 plugs into the connector 160 of the server in order to adapt the server's authentication cradle 164 to another configuration.

Thus, an authentication cradle for a multimedia server consistent with certain embodiments has a cradle for receiving a wireless component and connecting thereto. A switch resides on the cradle and is actuated upon connecting the wireless component to the cradle, wherein the manipulable authentication element is not a general purpose data entry element. An electrical cable or other means for communication with a server overseeing communication with components on a list of authenticated components is provided, wherein a person can cause the server to regard an component as being authenticated by mating the component with the cradle.

Those skilled in the art will appreciate that the present cradle has been depicted as a simple curved recipient for a similarly curved client device, but this should not be considered limiting since any suitable cradle arrangement can similarly be used, such as for example, cradles used for connection of PDA devices and cellular telephones to computers.

Therefore, when both devices are powered on, placing the wireless device into the cradle initiates a transaction between the devices that authorizes the new device into the wireless network. An LED such as 24 or other indicator can light or change color, for example turn green, when the authorization is accomplished. When the mobile device is placed in the cradle the "mating action" of the connectors in the access point and the client depresses the buttons built into the connector. A timestamp check between the access point and the client shows that the buttons were depressed within some small margin of time. The access point or server then proceeds with the procedure to authorize the client to use the wireless network.

The connector cradle should preferably, but not necessarily, be made to allow the mobile client to be set into it facing either direction. In other embodiments, the cradle 190 can be used to support legacy devices by providing a cradle that has a USB interface and software that runs on the server. This invention could be used in a home network as described, but also can find use in locations such as Internet Cafés and other "wireless hot spot" locations as a simple mechanism to allow timed temporary access to the wireless network for cafe patrons.

By requiring that a human manipulate a physical button on the server or cradle by insertion of the client device into the cradle to authenticate, electronic security measures are enhanced using physical security measures. That is, the user must be able to have physical access to the server in order to either authenticate a component of the network.

Software and/or firmware embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description. All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. .sctn. 112, sixth paragraph, unless the element is expressly recited using the phrase "means for" or, in the case of a method claim, the element is recited as a "step" instead of an "act".

What is claimed is:

1. A wireless home entertainment system, comprising:
   at least one server, wherein the server includes a cradle having a first authentication switch forming a part thereof, wherein the first authentication switch is not a general purpose data entry element;
   at least one component in wireless communication with the server, the component having a cradle mating portion that mates in the cradle;
   a second authentication switch residing at the cradle mating portion; and
   wherein a person can cause the server to regard the component as being authenticated by mating the cradle mating portion with the cradle in a manner that causes actuation of said first and second switches.

2. The system of claim 1, wherein the first and second switches comprise buttons.

3. The system of claims 1, wherein the first and second switches reside within a connector device forming a part of the cradle and cradle mating portion respectively.

4. The system of claim 1, wherein the authentication comprises adding the component to a list of authorized components.

5. The system of claim 1, wherein the server further comprises means for indicating that the component is authenticated.

6. The system of claim 5, wherein the means for indicating generates an audible or visual signal.

7. The system of claim 1, wherein the server further comprises logic for authenticating the component when the switches are actuated approximately simultaneously with each other.

8. The system of claim 1, wherein the server includes logic for authenticating the component when the switches are actuated within a predetermined time threshold of each other.

9. The system of claim 1, wherein the component includes logic for transmitting at least one component identification in response to actuation of the second switch.

10. The system of claim 1, wherein the component includes logic for transmitting at least one encryption result generated at least in part using a component identification, the encryption result being transmitted in response to actuation of the second switch.

11. A method for authenticating a component in wireless communication with a server to the server, comprising:
    mating the component to a cradle residing on the server in order to actuate a switch on the server;
    the mating further causing actuation of a switch on the component to cause the component to transmit a message; and
    returning "authenticated" at the server in response to receiving the message only if the switches are actuated within a predetermined time period of each other.

12. The method of claim 11, wherein the component is authenticated only if the switches are actuated approximately simultaneously.

13. The method of claim 11, comprising transmitting at least one component identification in response to mating the component with the cradle and thus actuating the switches.

14. The method of claim 11, comprising transmitting at least one encryption result generated at least in part using a component identification, the encryption result being transmitted in response to actuation of the switch on the component.

15. The method of claim 11, comprising providing visual or audible indication of successful authentication of the component.

16. A computer readable storage medium storing instructions which, when executed on a programmed processor, carry out a process as described in claim 11.

17. A multimedia server, comprising:
   a cradle for receiving a wireless component and connecting thereto;
   a manipulable authentication element coupled to the server that can be actuated by a person, wherein the manipulable authentication element is not a general purpose data entry element;
   a switch residing on the cradle tat is actuated upon connecting the wireless component to the cradle;
   a wireless transceiver for wireless communication with network components; and
   a programmed processor overseeing communication with components on a list of authenticated components, and wherein a person can cause the server to regard a component as being authenticated by actuating the manipulable authentication element within a predetermined time of mating the component with the cradle thereby actuating the switch.

18. The device of claim 17, wherein the cradle forms an integral part of the server.

19. The device of claim 17, wherein the cradle is attached to the server by an electrical cable.

20. The device of claim 17, wherein the switch resides within a connector device forming a part of the cradle.

21. The device of claim 17, wherein the authentication comprises adding the component to a list of authorized components.

22. The device of claim 17, wherein the server further comprises means for indicating that the component is authenticated.

23. The device of claim 22, wherein the means for indicating generates an audible or visual signal.

24. The device of claim 17, wherein the server further comprises logic for authenticating the component when the manipulable authentication element is actuated approximately simultaneously with the switch that is also actuated upon mating the component with the cradle.

25. The device of claim 17, wherein the server includes logic for authenticating the component when the manipulable authentication element is actuated within a predetermined dine threshold of actuation of a switch on the component that is also actuated upon mating the component with the cradle.

26. An authentication cradle for a multimedia server, comprising:
   a cradle for receiving a wireless component and connecting thereto;
   a manipulable authentication element residing on the cradle that can be actuated by a person;
   a switch that is actuated upon connecting the wireless component to the cradle;
   wherein the manipulable authentication element is not a general purpose data entry element; and
   means for communication with a server overseeing communication with components on a list of authenticated components, and wherein a person can cause the server to regard a component as being authenticated by actuating the manipulable authentication element within a specified time of mating the component with the cradle.

27. The device of claim 26, wherein the means for communication comprises an electrical cable for connection to the server.

28. The device of claim 26 wherein the switch resides within a connector device forming a part of the cradle.

29. The device of claim 26, wherein the authentication comprises adding the component to a list of authorized components.

30. A method of authenticating a wireless component with a server, comprising:
   mating the wireless component to the server;
   actuating a manipulable authentication element on the server within a predetermined time of actuating a switch at the wireless component; and
   wherein the wireless component is considered authenticated when the switch and the manipulable authentication element are both in an actuated state within a predetermined time period.

31. The method according to claim 30, wherein the switch resides on the wireless component.

32. The method according to claim 30, wherein the switch resides on a connecting device to which the wireless component is mated.

* * * * *

UNITED STATES PATENT AND TRADEMARK OFFICE
CERTIFICATE OF CORRECTION

PATENT NO. : 7,356,691 B2 Page 1 of 1
APPLICATION NO. : 11/050556
DATED : April 8, 2008
INVENTOR(S) : Dawson It is certified that error appears in the above-identified patent and that said Letters Patent is hereby corrected as shown below:

Claim 17, col. 9, line 14, delete "tat" and insert -- that -- therefor.

Signed and Sealed this

Fifteenth Day of July, 2008

JON W. DUDAS
*Director of the United States Patent and Trademark Office*